(12) United States Patent
Strauss

(10) Patent No.: US 6,524,190 B1
(45) Date of Patent: Feb. 25, 2003

(54) OSCILLATION DAMPER

(75) Inventor: Dietmar Strauss, Bühl (DE)

(73) Assignee: LuK Lamellen und Kupplungsbau Beteiligungs KG, Buhl (DE)

(*) Notice: Subject to any disclaimer, the term of this patent is extended or adjusted under 35 U.S.C. 154(b) by 0 days.

(21) Appl. No.: 09/521,826

(22) Filed: Mar. 9, 2000

(30) Foreign Application Priority Data

Mar. 10, 1999 (DE) .......................................... 199 10 456

(51) Int. Cl.[7] ................................................. F16D 3/12
(52) U.S. Cl. ............................................. 464/64; 464/68
(58) Field of Search ............................... 464/7, 24, 64, 464/67, 68; 192/213.1, 213.11, 213.2, 113.5; 384/585

(56) References Cited

U.S. PATENT DOCUMENTS

| | | | | |
|---|---|---|---|---|
| 2,127,996 A | * | 8/1938 | Havill ......................... | 464/68 |
| 4,347,717 A | * | 9/1982 | Lamarche ............ | 192/213.1 X |
| 4,729,465 A | | 3/1988 | Reik | |
| 5,088,964 A | * | 2/1992 | Kuhne ....................... | 464/24 X |
| 5,211,489 A | * | 5/1993 | Moore ........................ | 384/585 |
| 5,261,516 A | * | 11/1993 | Friedmann ................ | 464/68 X |
| 5,273,372 A | * | 12/1993 | Friedmann et al. .. | 192/213.1 X |
| 5,393,266 A | * | 2/1995 | Braun et al. .................. | 464/67 |
| 5,711,730 A | | 1/1998 | Friedman et al. | |
| 5,761,970 A | * | 6/1998 | Bonfilio ..................... | 464/68 X |
| 5,882,264 A | * | 3/1999 | Yabe et al. .................... | 464/64 |
| 6,056,103 A | * | 5/2000 | Hashimoto et al. ....... | 464/68 X |
| 6,083,107 A | * | 7/2000 | Herbst ......................... | 464/64 |

* cited by examiner

Primary Examiner—Greg Binda
(74) Attorney, Agent, or Firm—Darby & Darby

(57) ABSTRACT

An oscillation damping apparatus which can be installed between the output shaft of an engine and the input shaft of a transmission in the power train of a motor vehicle has a flywheel driven by the engine and an output member normally serving to rotate the input shaft of the transmission. The flywheel defines an annular chamber for the first damper of a composite damper further including a second damper in series with and located radially inwardly of the first damper. The composite damper transmits torque between the flywheel and a hub forming part of the output member and serving to transmit torque to the input shaft of the transmission.

69 Claims, 4 Drawing Sheets

OSCILLATION DAMPER

BACKGROUND OF THE INVENTION

The present invention relates to improvements in vibration damping apparatus (also known as oscillation dampers) which can be utilized with advantage in the power trains of motor vehicles, for example, between the internal combustion engine and/or another prime mover and the change-speed transmission and/or another driven unit of the power train.

A vibration damping apparatus normally comprises input and output members (e.g., shafts) which are rotatable with and relative to each other about a common axis, and one or more energy storing elements (such as coil springs, diaphragm springs or the like) which yieldably oppose rotation of the input and output members relative to each other. Depending, for example, on the nature of the motor vehicle, the arrangement can be such that the input and output members of the vibration damping apparatus have limited or unlimited freedom of angular movement relative to each other. Furthermore, the resistance which the energy storing element(s) offers or offer to rotation of the input and output members relative to each other can remain substantially constant or varies, either gradually or stepwise, depending on the magnitude of fluctuations of torque which is to be transmitted from the input member to the output member under normal operational circumstances (when the engine drives the wheels of a motor vehicle), or under other than normal circumstances (e.g., when the vehicle is coasting).

Adequate damping of vibrations is desirable on the additional ground that it contributes significantly to the comfort of the occupant or occupants of a motor vehicle.

OBJECTS OF THE INVENTION

An object of the instant invention is to provide a vibration damping apparatus which can furnish an optimal or at least highly satisfactory vibrations damping action under normal circumstances of use as well as under certain exceptional circumstances, e.g., irrespective of fluctuations of RPM of the rotary output member of a prime mover, such as the rotary crankshaft or camshaft of an internal combustion engine in the power train of a motor vehicle.

Another object of the invention is to provide an apparatus which can reliably filter oscillatory movements between the driving and driven constituents of a power train.

A further object of the invention is to provide a novel and improved torque transmitting connection between a prime mover and a driven unit, e.g., between the prime mover and the transmission (such as a continuously variable transmission known as CVT) in the power train of a motor vehicle.

An additional object of the invention is to provide a vibration damping apparatus the characteristics of which can be readily selected or altered to carry out the required damping action in dependency upon the intended use of the apparatus and/or of the power train in which the apparatus is being put to use.

Still another object of the invention is to provide a simple and inexpensive but highly versatile vibration damping apparatus the useful life of which at least matches those of presently known and utilized vibration damping apparatus.

A further object of the invention is to provide a power train which employs one or more torsional vibration damping apparatus of the above outlined character.

SUMMARY OF THE INVENTION

The invention is embodied in a vibration damping apparatus which comprises an input member (e.g., a fly-wheel) which is rotatable about a predetermined axis and includes components (e.g., discs made of sheet metal) defining an annular chamber, an output member which is rotatable about the predetermined axis with and relative to the input member, and a damper assembly which is arranged to yieldably oppose rotation of the input and output members relative to each other and includes energy storing elements which are at least partially confined in the annular chamber (e.g., one, two or more of several energy storing elements can be fully or partially received in the annular chamber). The chamber has a sealed radially outer portion and is at least partially filled with a supply of a suitable viscous fluid. A radially inner portion of the output member comprises or constitutes a hub which is connectable with and is arranged to transmit torque to and receive torque from a rotary part of a power train. The damper assembly further comprises a rotary annular output element which is arranged to transmit torque between the input member and the hub and has at least some freedom of rotation relative to the input member against the opposition of at least some of the energy storing elements.

The rotary part of the power train can include a shaft which is non-rotatably receivable in the hub and can constitute the input shaft of a suitable transmission, e.g., an infinitely variable-speed transmission known as CVT.

The apparatus can further comprise means (e.g., an annular array of bolts and/or other suitable fasteners) for preferably separably affixing the input member to a rotary output part of a prime mover in a motor vehicle including the power train; the output part can constitute or include the crankshaft or camshaft of the internal combustion engine in a motor vehicle.

The aforementioned components of the input member can include two dished or cupped parts having radially outer portions which are remote from the predetermined axis and are sealingly secured to each other. As a rule, the components are or can constitute ring-shaped parts at least one of which is dished or cup-shaped. Such parts have neighboring radially outer portions which are remote from the predetermined axis, and the input member comprising such components can further include a circumferentially complete welded seam which sealingly connects the radially outer portions of the ring-shaped parts to each other to thus prevent escape of viscous fluid from the annular chamber radially outwardly beyond the radially outer portions of the ring-shaped parts.

At least one of the two components forming part of the input member can consist (entirely or in part) of a suitable metallic sheet material.

It is presently preferred to employ a viscous fluid which is a lubricant (e.g., a grease or another suitable high-viscosity fluid).

The annular chamber can be configured in such a way that it includes a plurality of sections each of which receives at least one energy storing element. The input member which defines such chamber is preferably provided with abutments which alternate with the arcuate sections of the annular chamber (as seen circumferentially of the chamber) and contact the energy storing elements in the neighboring sections of the chamber. For example, the annular chamber can include at least two arcuate sections having identical or similar radii of curvature. The energy storing elements in the sections of the annular chamber can include at least two arcuate energy storing elements with radii of curvature which at least approximate each other.

It is often preferred to design the annular chamber in such a way that it includes fewer than five arcuate sections each of which extends along an arc of between 60% and 96% of 360°/n (wherein n is the number of sections). Each energy storing element can comprise a single spring or a plurality of springs (e.g., two interfitted coil springs). The energy storing elements in the arcuate sections of the annular chamber can constitute arcuate energy storing elements having centers of curvature at least close to the predetermined axis; the energy storing elements in the sections of the annular chamber can extend along arcs of between 60% and 98% of 360°/n wherein n is the number of arcuate energy storing elements.

If the annular chamber is a circumferentially complete annular chamber, it is often preferred to select the dimensions of the energy storing elements in such a way that they occupy between about 60% and 95% of the chamber (as seen in the the circumferential direction of the input member).

Each energy storing element can comprise at least one coil spring. It is often preferred to select and assemble and install the energy storing elements in such a way that at least one of these elements comprises a plurality of coil springs which operate in series; the coil springs of such plurality can include at least two springs having different stiffnesses. Furthermore, at least one of the energy storing elements can include a plurality of interfitted coil springs which may but need not have identical lengths.

The arrangement can be such that the annular chamber has a first radius of curvature and at least one of the energy storing elements has a second radius of curvature which matches or at least approximates the first radius of curvature.

One component of the input member can be constructed and dimensioned and designed in such a way that it includes a radially outer portion remote from and a radially inner portion nearer to the predetermined axis. The radially inner portion can be provided with openings for the aforementioned fasteners which are arranged to connect the one component (i.e., the input member) to a rotary output part of a prime mover, and the aforementioned rotary annular output element of the apparatus can be provided with windows which afford access to a tool (such as a screwdriver or a wrench) for manipulation of the fasteners for the purpose of attaching the input member to the output part of the prime mover, to tighten the fasteners, or to detach the input member from the prime mover.

The one component can constitute a dished component, and the fasteners can constitute threaded fasteners having (a) shanks extending through the respective openings of the one component when the latter is connected to the output part of the prime mover and (b) heads which are accessible to the tool when the one component is connected to the output part of the prime mover.

The apparatus can further comprise a gear (e.g., a large-diameter starter gear) which is affixed to the input member. Alternatively, or in addition to the gear, the input member can be provided with or can carry a suitable pulse generating device; the latter can serve to transmit impulses for management of the internal combustion engine in the power train of a motor vehicle if the improved apparatus is put to use in such power train.

The input member of the improved apparatus can be designed in such a way that it includes a substantially disc-shaped first component connectable to a rotary output part of a prime mover and having a radially outer portion remote from the predetermined axis, and an annular second component which is connected to the radially outer portion of the first component. The chamber is flanked by the first and second components, and the aforementioned gear can constitute a ring-shaped gear which is carried by the second component of the input member. Such apparatus can further include a ring-shaped carrier which is affixed to the second component and supports the gear, and the carrier can comprise a tubular portion which is at least substantially coaxial with the input member and supports the gear. At least some of the energy storing elements can be disposed at a first radial distance from the predetermined axis, and the carrier can constitute a ring which is located at a second radial distance from the predetermined axis; the second distance can match or at least approximate the first distance.

An arcuate internal surface of the input member bounds the radially outer portion of the annular chamber, and the energy storing elements preferably include arcuate springs which bear against the internal surface of the input member, either permanently or at least under the action of centrifugal force while the input member rotates about the predetermined axis. The outline of the internal surface of the input member is preferably such that the internal surface at least partially conforms to the outlines of radially outermost portions of the arcuate springs.

The input member can further comprise a wear-resistant portion which defines the aforementioned internal surface; such wear resistant portion can include or constitute at least one insert which is carried by at least one component of the input member. The at least one insert can comprise or can consist of sheet steel. The hardness of the insert can exceed the hardness of at least one of the aforementioned components forming part of the input member. The wear-resistant portion or insert can have an arcuate cross-sectional outline in a plane including the predetermined axis; such cross-sectional outline can have an at least substantially constant radius of curvature and can extend along an arc of between about 45° and 120°, for example, along an arc of between about 60° and 90°. For example, the wear-resistant portion of the input member can include or constitute a substantially trough-shaped arcuate insert.

The damper assembly of the improved apparatus can include a first damper having a first set or group of energy storing elements and being located in the radially outer portion of the annular chamber, and a second damper located radially inwardly of the first damper. The first and second dampers can be connected in series with each other. Furthermore, the second damper can be disposed radially inwardly of one (e.g., the second) component of the input member, and such second damper can include a second set or group of energy storing elements. The aforementioned rotary annular output element of such apparatus can be non-rotatably connected with the hub of the output member and can be provided with windows for the energy storing elements of the second set or group. The apparatus can be provided with an annular section which surrounds and is rotatable relative to the rotary annular output element. The annular section extends radially outwardly beyond the second damper and engages the energy storing elements of the first set or group. The annular section of the damper assembly can be provided with arms which alternate with the energy storing elements of the first set or group (as seen in the circumferential direction of the annular chamber). The output member of such apparatus can be provided with two substantially disc-shaped walls which are non-rotatably connected with and flank the rotary annular output element as seen in the direction of the predetermined axis. The walls can be located radially inwardly of the first damper and can be provided with windows for the energy storing elements of the second set or group.

The rotary annular output element includes a radially outer portion which can be provided with first profiled sections, and the aforementioned annular section of the damper assembly has a radially inner portion which can be provided with second profiled sections mating with the first profiled sections with a certain play as seen in the circumferential direction of the rotary annular output element. The first and second profiled sections preferably define variable-capacity compartments for the viscous fluid. Such apparatus can further comprise sealing means (e.g., in the form of ring-shaped washers) which flank the compartments as seen in the direction of the predetermined axis. The aforementioned play can determine the extent of angular movability of constituents of the second damper relative to each other.

The novel features which are considered as characteristic of the invention are set forth in particular in the appended claims. The improved vibration damping apparatus itself, however, both as to its construction and the modes of assembling and operating the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 2 is a sectional view substantially as seen in the direction of arrows from the composite line II—II shown in FIG. 1;

DESCRIPTION OF PREFERRED EMBODIMENTS

Figure 1:
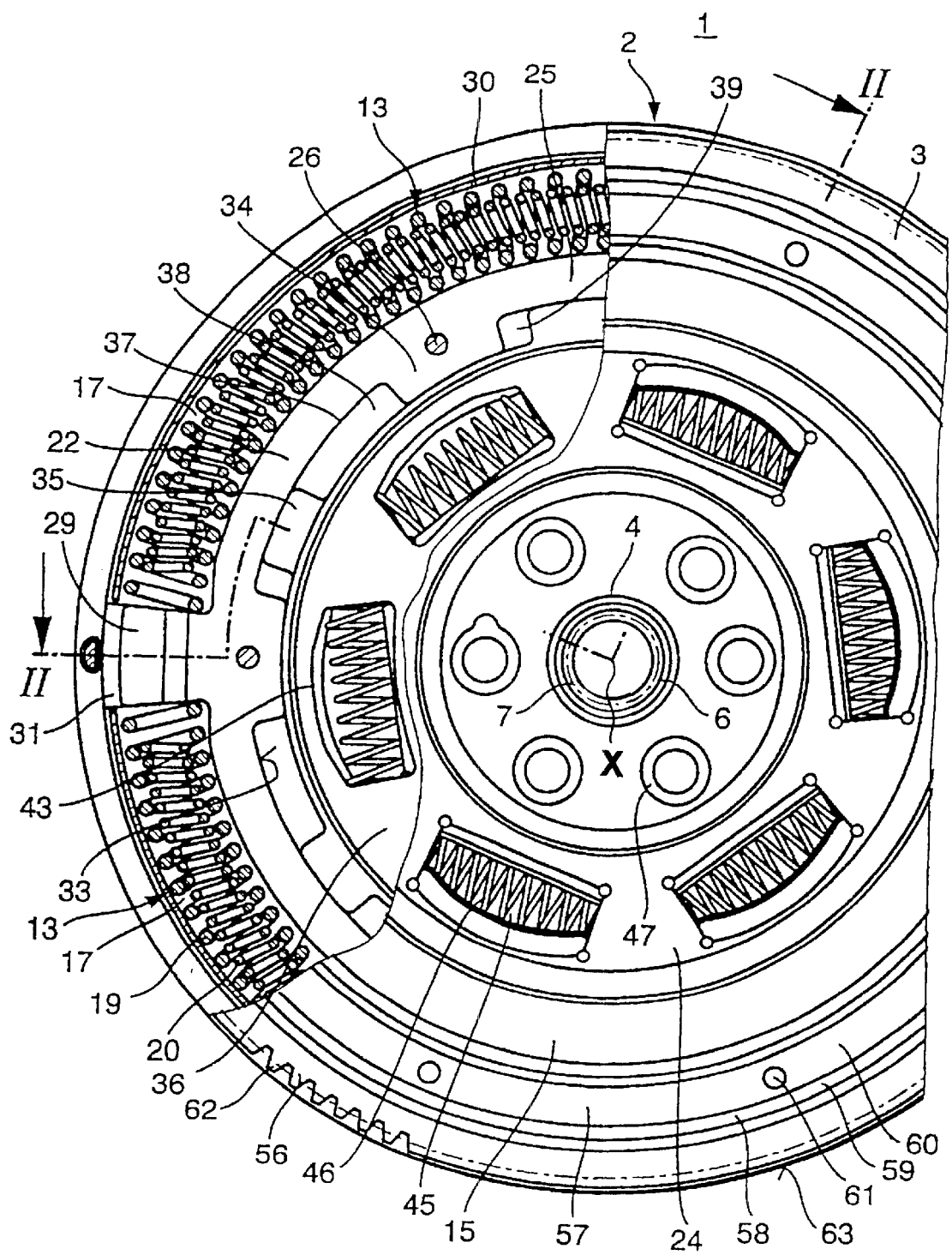
FIG. 1 is a fragmentary elevational view of a vibration damping apparatus which embodies one form of the present invention, a portion of one component of the input member being broken away and the view being taken in the direction of arrow I shown.
Figure 2:
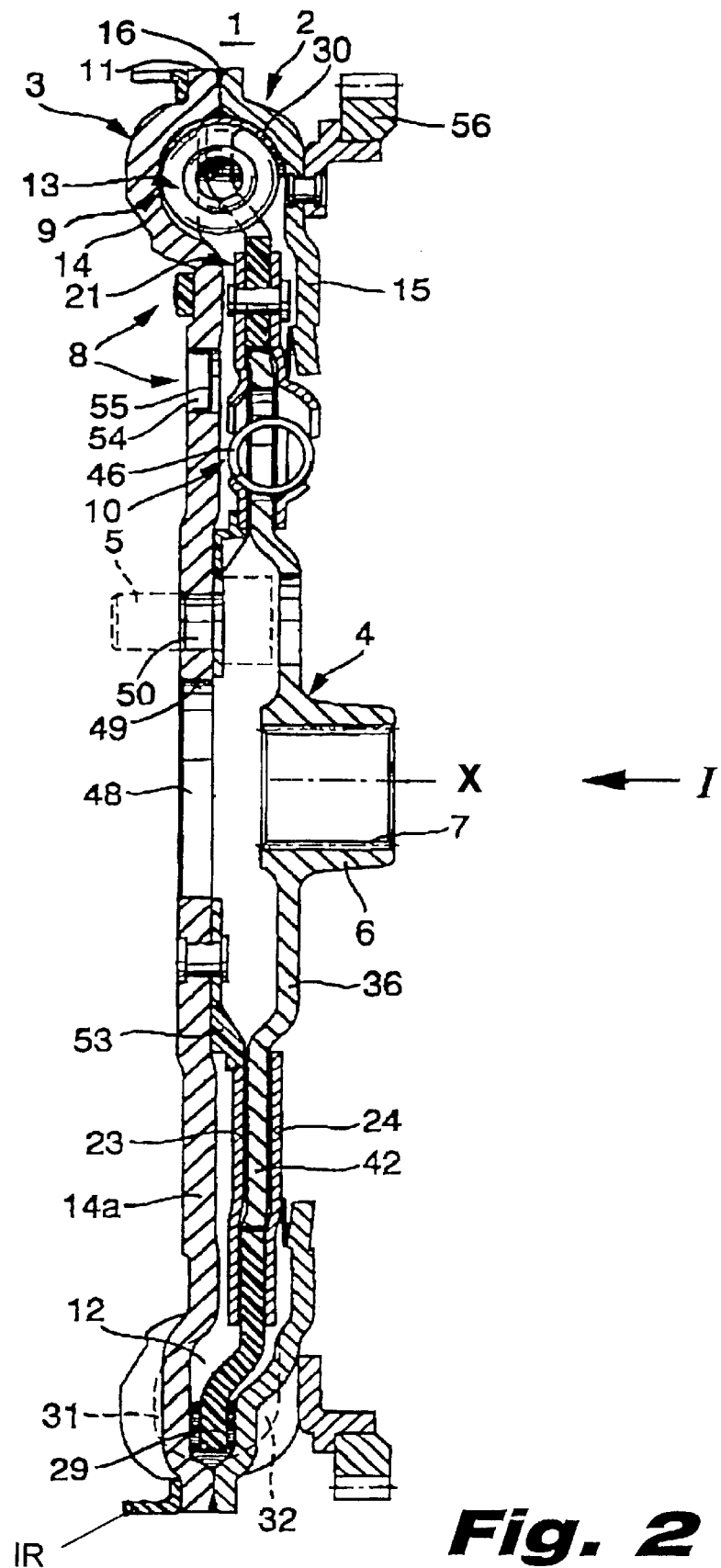
in FIG. 2.
Figure 3:
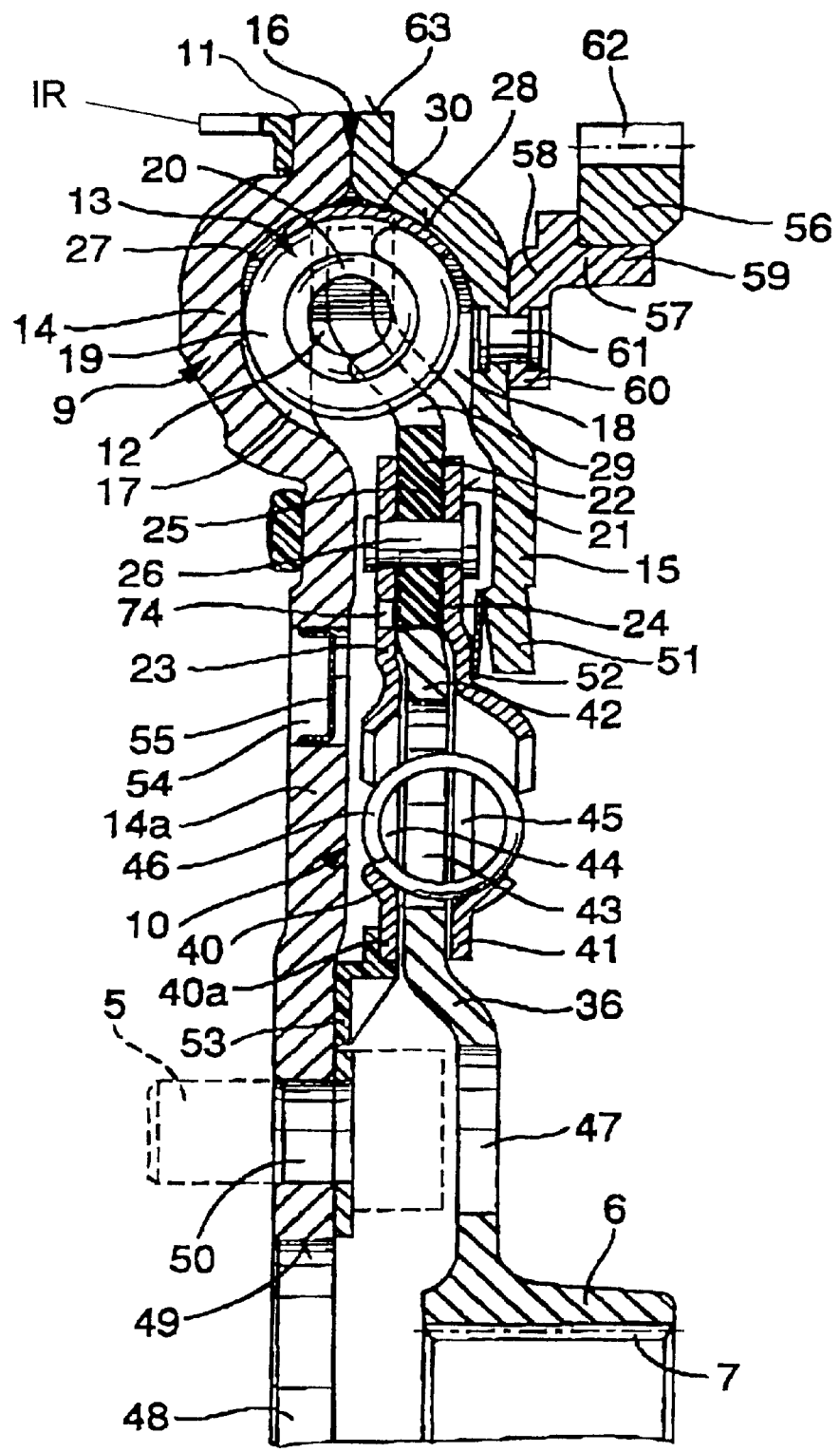
FIG. 3 is an enlarged view of the upper half of the structure shown in FIG. 2.

Referring first to FIGS. 1 to 3, there is shown a portion of a power train 1 including a vibration damping apparatus 2 which embodies one form of the present invention. The power train 1 can be of the type described, for example, in commonly owned U.S. Pat. No. 4,729,465 granted Mar. 8, 1988 to Wolfgang Reik for "ASSEMBLY FOR COMPENSATING FOR FLUCTUATIONS OF TORQUE WHICH IS TRANSMITTED BY AN INTERNAL COMBUSTION ENGINE". The apparatus 2 comprises a rotary input member 3 which can receive torque from the output element of a prime mover (e.g., from the camshaft or crankshaft of an internal combustion engine in the power train) and is rotatable about an axis X. The input member 3 normally transmits torque to a coaxial rotary output member 4 by way of a novel damper assembly 8 including an outer damper 9 and an inner damper 10.

The input member 3 is a composite flywheel including coaxial cupped or dished components 14, 15 at least one of which can be made of a suitable metallic sheet material. The component 14 has a radially extending radially inner portion 14a which can be separately affixed to the rotary output part of the prime mover by an annulus of threaded fasteners 5. The output member 4 comprises a centrally located hub 6 having internal splines or teeth 7 and being adapted to non-rotatably receive a portion of a rotary input part, e.g., the input shaft of a multistage or infinitely variable transmission, not shown. For example, the transmission which normally receives torque from the hub 6 can constitute a CVT of the type disclosed in commonly owned U.S. Pat. No. 5,711,739 granted Jan. 27, 1998 to Oswald Friedmann et al. for "TORQUE MONITORING APPARATUS".

The components 14, 15 of the input member 3 can be said to form a housing 11 which defines an annular chamber 12 for at least some of the energy storing elements 13 and 46 respectively forming part of the dampers 9 and 10. The radially outer portion of the annular chamber 12 is sealed by a circumferentially complete welded seam 16 between the abutting radially outermost portions of the components 14, 15, and such radially outermost portion of the chamber receives the composite energy storing elements 13 of the outer damper 9. Each energy storing element 13 comprises an arcuate coil spring 19 and a somewhat shorter arcuate coil spring 20 which is fitted into the coil spring 19.

The seam 16 can be formed by resorting to a laser beam welding technique, to electron beam welding or to a welding procedure which involves pressing the parts (14, 15) to be welded against each other and by thereupon applying an a-c current of high amperage and low voltage in order to heat the abutting parts to welding temperature.

The components 14, 15 are provided with radially extending partitions which divide the annular chamber 12 into arcuate sections 17, 18 each of which receives a composite energy storing element 13 including a pair of interfitted coil springs 19 and 20. The radii of curvature of the sections 17, 18 are or can be identical with those of the energy storing elements 13, and their centers of curvature are located at or close to the axis X. The number of pairs of sections 17, 18 need not exceed five and each such section can extend along an arc of between 60% and 96% of 360°/n wherein n is the number of the respective sections.

The sections 17, 18 of the annular chamber 12 are actually defined by mirror symmetrical arcuate pockets or recesses 27, 28 which are formed in the confronting inner sides or surfaces of the components 14 and 15 of the input member 3. The pockets 27, 28 can be formed simultaneously with shaping of the components 14, 15 which (as already mentioned above) can be made of metallic sheet material in a stamping or an analogous deforming machine. The damper 9 has a flange-like output element 21 and the springs 19, 20 of the composite energy storing elements 13 extend beyond both sides of the element 21 and into the respective receptacles or pockets 27, 28 to undergo compression when the input member 3 is turned relative to the output member 4 and/or vice versa.

The output element 21 of the outer damper 9 includes or is constituted by an annular section 22 which is flanked by and is rigidly connected with two sheet-metal walls 23, 24 of the output member 4 by fasteners 26 here shown as rivets. The walls 23, 24 extend radially inwardly beyond the annular section 22 and their radially outer portions are affixed, to the annular main or major part 25 of the annular section 22 by the aforementioned rivets 26. The peripheral portion of the major part 25 of the annular section 22 is provided with radially outwardly extending projections 29 in the form of prongs or arms or lugs (hereinafter called arms) which alternate with the composite energy storing elements 13 of the damper 9 in the radially outermost portion of the annular chamber 12. The elements 13 store additional energy or dissipate energy in response to rotation of the components 14, 15 and the annular section 22 relative to each other.

FIGS. 2 and 3 show that the arms 29 are bent axially of the apparatus 2 in a direction toward the radially outer portion of the component 14, i.e., toward the engine when the portion 14a of the component 14 is affixed to the rotary output part of the engine. Such configuration of the arms 29 is desirable and advantageous in many embodiments of the apparatus 2 because this contributes to compactness of the combination including the engine and the vibration damping apparatus. Furthermore, such configuration of the arms 29 is advisable in apparatus of the type shown in FIGS. 1 to 3 because the radially outer portion of the annular chamber 12 is shifted axially of the apparatus beyond the radial portion 14a of the component 14 in a direction to the left, as viewed in FIGS. 2 and 3. The extent of axial shifting of radially outermost portions of the arms 29 can equal or approximate the radius of an energy storing element 13 (i.e., the radius of a convolution of a coil spring 19).

FIGS. 2 and 3 further show that the surfaces bounding the radially outer portions of the receptacles or pockets 27, 28 closely conform to the outlines of adjacent portions of the coil springs 19. This is desirable and advantageous because such surfaces constitute abutments for the coil springs 19 at least when the input member 3 rotates, i.e., when the energy storing elements 13 are being acted upon by centrifugal force.

In order to reduce or minimize wear upon the radially outer portions of the coil springs 19 and/or upon the adjacent internal surfaces of radially outer portions of the components 14, 15, the input member 3 is provided with an insert 30 made of a material (e.g., sheet steel) which is more resistant to wear than the material of the component 14 and/or 15 and which is contacted by the coil springs 19 at least when the input member 3 rotates, either because it is driven by the engine or while the motor vehicle is coasting. The illustrated insert 30 resembles an arcuate (normally annular) trough having (in a plane including the axis X) an arcuate shape and overlying the radially outer portions of the soil springs 19 along an arc of between about 45° and 120°, preferably along an arc of between about 60° and 90°. The hardness of the insert 30 can exceed that of the components 14 and 15.

Those portions of end convolutions of the coil springs 20 and/or 19 which are received in the pockets 27, 28 contact radially extending abutments 31, 32 which, in the embodiment of FIGS. 1 to 3, are integral parts of the components 14, 15, respectively. Each arm 29 is flanked by a pair of abutments 31, 32. The two pairs of abutments 31, 32 at the ends of an arcuate section 17 determine the maximum length of a composite energy storing element 13; each such energy storing element can be received in the respective arcuate section 17 in a prestressed condition.

At least the radially outer sections 17 of the annular chamber 12 contain a viscous fluid, preferably a lubricant of greasy or pasty consistency. The quantity of viscous fluid is preferably selected in such a way that the fluid fills the sections 17 under the action of centrifugal force at least when the apparatus 2 rotates.

FIG. 1 shows that the annular section 22 of the output part of the radially outer damper 9 is provided with a central opening 33 and with profiled portions in the form of lugs 34 extending radially inwardly into the opening 33. The profiled portions 34 are coplanar and alternate with profiled portions 35 in the form of lugs forming part of and extending radially outwardly from the major part of an annular flange-like rotary output element 36 of the composite damper 8. The output element 36 is rigid (e.g., of one piece) with the hub 6 of the output member 4. For example, the element 36 can be provided with six profiled portions 35 which are equidistant from each other as seen in the circumferential direction of the hub 6. The clearances or gaps 37 between the profiled portions 34 of the annular section 22 and the profiled portions 35 of the element 36 determine the maximum extent of deformability of the coil springs 46 of the inner damper 10. The rivets 26 connect the walls 23, 24 to the profiled portions 34 of the annular section 22.

The profiled portions 34, 35 of the section 22 and annular output element 36 define compartments 38, 39 which are flanked by the adjacent, portions of the walls 23, 24. The quantity of viscous fluid in the chamber 12 can be selected in such away that the fluid at least partially fills the compartments 38, 39 and is squeezed out of such compartments when the element 36 and the section 22 are caused to turn relative to each other; this produces a desirable damping action because the walls 23, 24 act as flow restrictors and enable the outflowing and inflowing fluid to oppose rotation of the element 36 and the section 22 relative to each other. The parts 22–26 together constitute an annular intermediate section of the apparatus, and more specifically of the damper assembly 8; this intermediate section is disposed between the components 14, 15 and extends radially outwardly beyond the damper 9 and engages the energy storing element of the two sets.

If the quantity of viscous fluid in the radially outer portion of the annular chamber 12 is relatively small so that such fluid cannot fill the compartments 38, 39 it is often advisable to provide a second body or supply of viscous fluid (lubricant) which at least partially fills the compartments 38, 39. This is desirable because the viscous fluid in the compartments 38, 39 prevents or reduces the generation of noise and prolongs the useful life of the apparatus 2. It will be seen that the walls 23, 24 are connected to the profiled portion 35 of the section 22 in such a way that they establish a seal which prevents escape of appreciable quantities of or any viscous fluid from the compartments 38, 39 at least radially outwardly toward the radially outer portion of the chamber 12. It can be said that the parts 23, 24, 25 define a sealed annular chamber including the compartments 38 and 39.

FIG. 3 shows that at least one (23) of the walls 23, 24 is provided with one or more parts 74; these ports are located at the same radial distance from the axis X as the profiled portions 34, 35 (i. e., as the compartments 38, 39). The port or ports 74 serves or serve to absorb viscous fluid which is applied to the profiled portions 34, 35. The provision of one or more ports 74 is particularly desirable when the quantity of viscous fluid in the space between the components 14, 15 of the input member 3 is sufficient to enable the port or ports 74 to draw viscous fluid when the input and output members 3, 4 turn relative to each other.

The walls 23, 24 of the output member 4 include portions 40, 41 which flank an annular portion 42 of the output element 36. The portions 40, 41 and 42 are respectively provided with at least partially registering windows 44, 45, 43 for portions of the aforementioned arcuate or straight coil springs 46 constituting the energy storing elements of the radially inner damper 10. The latter operates in series with the outer damper 9.

The output element 36 of the composite damper 8 in the apparatus 2 of FIGS. 1 to 3 is of one piece with the hub 6 of the output member 4 and is provided with windows 47 which afford access to the heads of the bolts 5 constituting the means for fastening the portion 14a of the component 14 of the input member 3 to the output part of a prime mover.

The shanks of the bolts 5 extend through openings 50 in the radially inner part of the portion 14a. The windows 47 afford access to the heads of the bolts 5 when the apparatus 2 is to be attached to or detached from or tightened on the output part of the prime mover by means of a screw driver, a wrench or another suitable tool.

The apparatus 2 can be assembled into a module which is ready to be affixed to the output part of the engine or another suitable prime mover in the power train 1 by means of the bolts 5 and/or analogous fasteners. The surface 49 bounding the central opening 48 of the radially inwardly extending portion 14a of the component 14 can serve as a means for centering the assembled module on the prime mover of the power train 1 prior to tightening of the bolts 5. Such centering of the module necessitates the provision of a protuberance which forms part of or is affixed to the output part of the prime mover and is an accurate fit in the opening 48. The bolts 5 can be dimensioned in such a way that their shanks must be inserted through the openings 50 before the output member 4 is attached to the input member 3 because the heads of the bolts cannot pass through the windows 47 of the output element 36; this ensures that the bolts cannot be lost or misplaced once the assembling of the module is completed. Such dimensioning of the bolts 5 and windows 47 ensures that the bolts are ready to be tightened as soon as the internal surface 49 of portion 14a of the component 14 properly centers the module on the output part of the prime mover.

It is presently preferred to confine in the annular chamber 12 a supply of a lubricant which has a viscosity and an ability to stand elevated temperatures such that the radially inner portion of the chamber 12 need not be sealed because lubricant does not tend to flow radially inwardly toward the axis X even when the apparatus 2 does not rotate. In other words, once the lubricant has entered the radially outer portion of the chamber 12, it remains there and can lubricate the exposed surface of the wear-resistant insert 30 as well as the adjacent portions of the coil springs 19 and the coil springs 20 within the springs 19.

The annular radially innermost portion 51 of the component 15 of the input member 3 serves as an abutment for at least one sealing element 52 which, in the embodiment of FIGS. 1 to 3, is a ring-shaped washer which functions as a diaphragm spring reacting against the portion 51 and bearing against the adjacent portion of the wall 24, i. e., against one portion of the output part 21 of the radially outer damper 9. The bias of the diaphragm spring 52 is or can be selected in such a way that it establishes a predetermined frictional hysteresis which is effective in parallel with the coil springs 19, 20 and 46 of the dampers 9 and 10. At the same time, the diaphragm spring 52 seals the adjacent portion of the housing 11 comprising the components 14 and 15. Such seal need not necessarily serve to prevent the escape of a highly viscous lubricant from the housing 11 but rather as a means for preventing the penetration of contaminants into the housing.

The windows 45 of the wall 24 for portions of the coil springs 46 are open to the atmosphere (as seen in the direction fo the axis X) However, it is within the purview of the invention to provide the portion 41 of the wall 24 with recesses or depressions which replace the windows 45 to thus ensure that the radially inner portion of the interior of the housing 11 is even more reliably sealed from the surrounding atmosphere.

The bias of the diaphragm spring 52 upon the wall 24 is taken up in part by a ring-shaped friction bearing 53 which is inserted between the portion 14a of the component 14 and the radiallyvinner; portion 40 of the wall 23. The friction bearing 53 surrounds the annulus of bolts 5 and is in frictional engagement with the parts 14a and 23; this bearing is engaged by the radially innermost portion 40a of the wall 23 and can be made of or can contain a material which promotes its resistance to slippage, i.e., which ensures that the friction bearing is in adequate frictional engagement with the adjacent side of portion 14a of the component 14. The radially innermost portion 40a of the wall 23 can be non-rotatably affixed to the friction bearing 53.

The bearing 53 can perform the additional function of centering the module including the assembled input and output members 3, 4 on the output part of the prime mover (such centering action can be provided in addition to or it can replace that of the internal surface 49 bounding the central opening 48 of the portion 14a). It is then advisable to establish at least a slight radial clearance between the output element 36 and the output part 21 of the damper 9 in order to compensate for eventual minor misalignments between the output part of the prime mover and the input part (in the hub 6) of the transmission in power train 1.

It is further possible to center the output part 21 of the damper 9 on the annular output element 36, for example, by way of the profiled portions 34 and/or 35. In such modified apparatus, the output element 36 and the part 21 are preferably assembled with limited freedom of radial movement relative to the input member 3 in order to compensate for possible misalignment between the output part of the prime mover and the input part which receives torque from the hub 6 and constitutes or can constitute a shaft rotatable in the case of a transmission.

The portion 14a of the component 14 is provided with one or more openings 54 which permit introduction of viscous fluid into the chamber 12 and which are normally sealed by plugs or caps 55 or in any other suitable way. The plugs or caps 55 are optional, especially if the viscosity of the body of fluid which is confined in the housing 11 is high and if such fluid fills only that portion of the chamber 12 which is located radially outwardly of the opening(s) 54.

FIGS. 2 and 3 show that the inner damper 10 is located radially inwardly of the radially innermost portion 51 of the component 15 forming part of the input member 3.

The component 15 carries a large-diameter starter gear 56 here shown as a spur gear having an annulus of external teeth 62. The gear 56 is mounted on a ring-shaped carrier 57, and more specifically on an axially extending tubular portion 59 of the carrier 57. The latter further comprises a radially extending portion 58 including a radially innermost part 60 which is riveted (at 61) to the radially outer portion of the component 15. The diameter of the annulus defined by the teeth 62 of the starter gear 56 is preferably less than or at most approximates the diameter of the peripheral surface 63 of the housing 11 including the components 14 and 15. It will be noted that the starter gear 56 is mounted at that side of the housing 11 which faces away from the prime mover when the module is affixed to the output part of the prime mover.

As already mentioned above, the hub 6 of the output member 4 can transmit torque to the rotary input element of a CVT, e.g., a transmission of the type disclosed in the aforementioned '730 patent to Friedmann et al.

In accordance with a further modification of the apparatus 2 shown in FIGS. 1 to 3, the member 21 (which constitutes or forms part of the output member of the damper 9 as well as the input part of the damper 10) can merely consist of two discs. For example, the walls 23, 24 can be enlarged radially outwardly to be deformed toward each other at a locus radially outwardly of the element 36. Such deformed portions of the enlarged walls 23, 24 can perform the functions of the arms 29.

In the embodiment of FIGS. 1 to 3, the walls 23, 24 serve as axial guides for the element 36. As can be best seen in FIGS. 2 and 3, the thickness of the element 36 is somewhat less than that of the main portion 25 of the annular section 22.

The profiled portions 34, 35 are disposed between the dampers 9 and 10 (as seen radially of the axis X) and (as already mentioned hereinbefore) serve to limit the extent of angular movability of the section 22 and element 36 relative to each other. The walls 23, 24 are called upon to merely transmit torque which is being built up and supplied by the coil springs 46 of the inner damper 10. Therefore, the walls 23, 24 can consist of a relatively thin metallic sheet material.

The feature that the length of each inner coil spring 20 is less than the length of the respective outer coil spring 19 enables the outer damper 9 to act as a multistage damper, e.g., a two-, three-, etc. stage damper. It is further desirable (at least in certain types of power trains) to select the dimensions of the composite energy storing elements 13 in such a way that the ratio of the length to diameter of each outer coil spring 19 is large or very large (see FIG. 1). The apparatus 2 of FIGS. 1 to 3 comprises only two energy storing elements 13 each of which is assumed to extend along an arc of approximately 170°. Such design of the elements 13 is desirable in many types of vibration damping apparatus because the input and output members 3, 4 can turn through large angles relative to each other; this, in turn, ensures that vibrations of the output part of the prime mover are less likely to be transmitted to the input part of the transmission, i.e., to the hub 6 of the output member 4.

It is often advisable to select the length-to-diameter ratio of the energy storing elements 13 in such a way that it is greater than 6:1, preferably greater than 10:1. It has been ascertained that a damper employing composite energy storing elements 13 which embody outer coil springs 19 having a length-to-diameter ratio of 6:1 or more can transmit large torques while the so-called spring factor (resistance to angular movement of the members 3, 4 relative to each other) remains relatively small. For example, the energy storing elements 13 can be designed to furnish an overall spring factor (i.e., a resistance to rotation of the input and output members 3, 4 relative to each other) in the range of 3–15 Nm/°. It has been found that an overall spring factor of between about 6–10 Nm/° is particularly advantageous in many or most instances. Such spring factor is further reduced if the dampers 9 and 10 operate in series.

It is often preferred to select the characteristics and/or parameters of the coil springs 46 in the inner damper 10 in such a way that the spring factor of the damper 10 is less than that of the outer damper 9. However, this does not exclude the possibility of employing a radially outer damper (9) having a first spring factor and a radially inner damper (10) having a larger second spring factor. Still further, the single-stage inner damper 10 of the apparatus 2 shown in FIGS. 1 to 3 can be replaced with a multistage damper, i.e., the coil springs 46 can be replaced by or utilized jointly with springs which are installed in and/or supported by the element 36 and the walls 23, 24 in such a way that the inner damper is a multistage damper.

It is often advisable to install the coil springs 46 and/or the energy storing elements 13 in prestressed condition, i.e., in such a way that they oppose each and every stage of angular movement of the input and output members 3, 4 relative to each other. For example, the arrangement can be such that, when the members 3, 4 begin to turn relative to each other from a starting position (see the point 64 in the coordinate system of FIG. 4), the coil springs 46 are subject to stressing or additional stressing ahead of the energy storing elements 13 or vice versa. Furthermore, the springs 46 can be caused to store additional energy when the elements 13 have already undergone maximum possible compression (so that they act as solid bodies) or vice versa. Thus, it is possible to select the characteristics of the dampers 9, 10 in such a way that their characteristic curves are indicative of a certain initial resistance to rotation of the members 3 and 4 relative to each other, and such initial resistance is followed by a lesser second resistance in view of the fact that the dampers 9, 10 operate in series. Otherwise stated, deformation of the coil springs 46 can precede or follow deformation of the coil springs 19, 20 or the spring 19, and the initial deformation of one or two sets of coil springs can be followed by joint deformation of all coil springs or by deformation of previously undeformed or merely prestressed coil springs. Once one of the dampers 9, 10 cannot undergo additional deformation, the resistance to further rotation of the members 3, 4 relative to each other normally increases.

Certain modes of operation of the apparatus 2 will be described with reference to the coordinate system of FIG. 4 wherein the curve at the right-hand side of the ordinate denotes the damping action while the engine of the motor vehicle including the power train 1 drives the wheels via hub 6, and the curve at the left-hand side of the ordinate indicates the damping action while the vehicle is coasting. More specifically, the magnitude of transmitted torque (in Nm) is measured along the ordinate, and the extent (in degrees) of angular displacement of the input and output members 3, 4 relative to each other is measured along the abscissa. The theoretical zero position or condition of the vibration damping apparatus 2 is shown at 64.

If the extent of angular displacement of the members 3, 4 from the zero position 64 (in the direction of pull) is changed by the relatively short distance 65, the magnitude of transmitted torque remains unchanged (namely zero). This will be appreciated by looking at FIG. 1 which shows (at the nine o'clock position) that the arm 29 has certain small or minimal amount of play relative to the adjacent end convolutions of the coil springs forming part of the two energy storing-elements 13. The same holds true if the angular displacement (through the distance 66) from the zero position 64 takes place in the coasting direction. The only resistance offered to angular displacements of the members 3, 4 relative to each other between the positions 65, 66 is that offered by frictional hysteresis. It is to be noted that the presentation of resistance to vibrations in the coordinate system of FIG. 4 is made without taking into consideration the frictions and hystereses which are superimposed upon the energy storing elements of the dampers 9 and 10.

When the angular displacement through the distance 65 or 66 is exceeded, the coil springs of the dampers 9 and 10 are caused to store energy. Since the two dampers operate in series, the magnitude of transmitted torque varies in a manner as denoted by the corresponding relatively flat portions of the curve while the extent of angular displacement increases between 65 and 67 in the direction of pull and between 66 and 68 in the direction of coasting, i.e., the resistance to angular displacement of the members 3, 4 relative to each other is small and increases at a relatively small rate.

Figure 4:
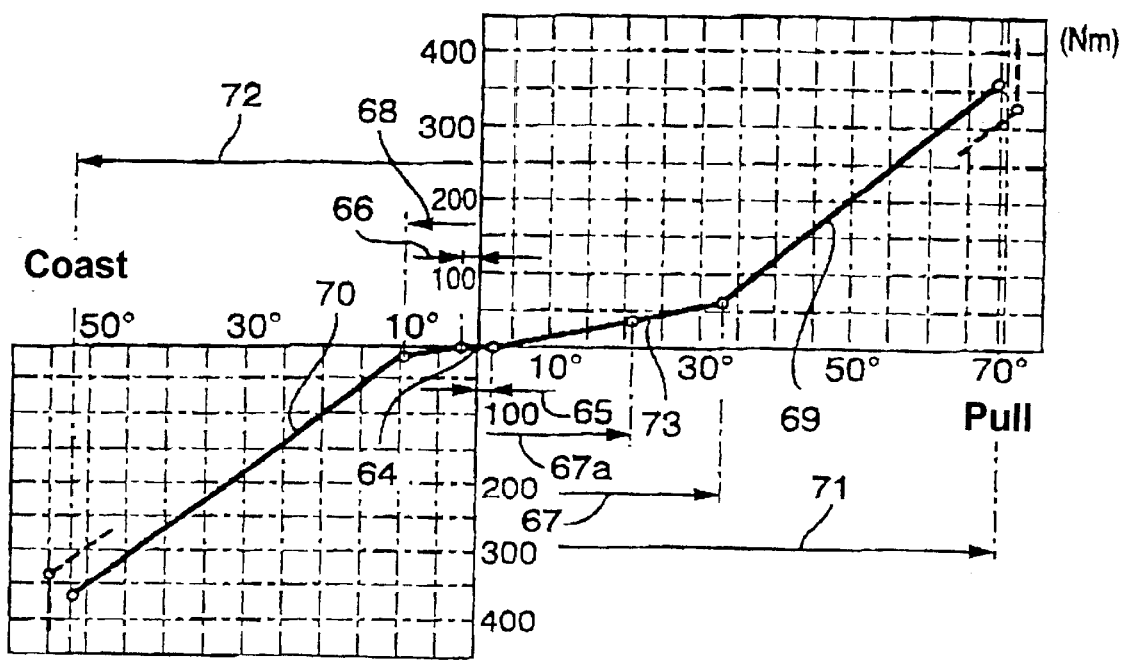
FIG. 4 is a coordinate system wherein the curve indicates one possible mode of variations of torque being transmitted by the apparatus of FIGS. 1 to 3.

When the extent of angular displacement of the members 3, 4 relative to each other (in the apparatus 2 whose operation is depicted in FIG. 4) reaches the value 67 or 68, the profiled portions 34 engage the respective neighboring profiled portions 35 so that, from there on, only the energy storing elements 13 can undergo further or additional compression. This is denoted by the respective steeper portions 69, 70 of the curve (between 67 and 71 for the pull and between 68 and 72 for coasting). The energy storing elements 13 cease to store additional energy when the extent of angular displacement of the members 3, 4 relative to each other reaches the value 71 (pull) or 72 (coasting) because the convolutions of each of the outer coil springs 19 then abut each other and each of these coil springs acts as a solid block.

The right-hand portion of FIG. 4 further shows the influence of the inner coil springs 20 upon the resistance which the members 3, 4 encounter to angular displacement relative to each other. Thus, the outer springs 19 of the energy storing elements 13 oppose the angular displacement of the members 3, 4 relative to each other until the angular displacement reaches the extent denoted by the character 67a (this is due to the fact that the coil springs 20 are shorter than the respective coil springs 19). From there on, the coil springs 19 undergo further compression and the coil springs 20 begin to store energy which results in a slight increase (at 73) of the slope of the curve denoting the magnitude of transmitted torque (measured in Nm/°).

An important advantage of the apparatus 2 is that the energy storing elements 13 of the outer damper 9 are predictably and reliably guided in the radially outer portion of the annular chamber 12 at all times, i.e., regardless of whether the input and output members 3, 4 dwell in their neutral positions (as shown at 64 in FIG. 4) or are caused to turn away from such neutral positions. Reliable guidance of the energy storing elements 13 renders it possible to employ long springs 20 and/or 19, i.e., to allow for large angular displacements of the members 3, 4 relative to each other.

Though a hydraulic fluid (flowable) medium (such as grease) is preferred in many instances, it is also possible to fill the chamber 12 and/or the compartments between the profiled portions 34, 35 with a pulverulent lubricating substance, e.g., graphite.

The input member 3 can be assembled of two (14, 15) or more components which may but need not always be made of a metallic sheet material. For example, at least one of these components can constitute a casting. Components made of sheet metal exhibit the advantage that they can be mass-produced at a relatively low cost and in readily available machines. Moreover, by resorting to a suitable stamping, embossing, drawing or analogous technique, one can convert sheet metal blanks into components (such as 14, 15) which can readily conform to the space that is available in a power train, which can stand pronounced deforming stresses, and which can be readily centered relative to, connected with and/or otherwise optimally related to other constituents of the vibration damping apparatus.

Still another advantage of components (such as 14 and 15) which are made of sheet metal is that the partitions between neighboring sections 17 of the annular chamber 12 can be formed during conversion of sheet metal blanks into such components. However, and if the circumstances (such as the availability or lack of availability of suitable machinery) render it necessary or advisable, the partitions between neighboring sections 17 (i.e., abutments for the end convolutions of the coil springs 19) can be obtained by employing separately produced parts which are thereupon riveted, welded or otherwise affixed to the components 14, 15 between the respective pockets 17, 18.

Utilization of relatively long one-piece coil springs 19, 20 which offer a relatively small resistance to angular displacements of the members 3, 4 relative to each other is desirable and advantageous for reasons already pointed out hereinbefore, as well as on the additional grounds that the damper employing such springs can damp (filter) high-amplitude vibrations (i.e., alternating changes of torque having pronounced peaks) as well as low-amplitude oscillations.

The assembly of a vibration damping apparatus in the form of a module can be simplified, and thus rendered less expensive, if the coil springs 19, 20 are deformed (curved) prior to insertion into the chamber 12 or into the windows 43–45. For example, the coil springs 19, 20 can be precurved so that their radii of curvature match or approximate the radius of curvature of the radially outermost portion of the chamber 12. Insertion of precurved springs 19, 20 into the chamber 12 constitutes a simple and time-saving operation which can be carried out without the need for auxiliary equipment.

The spring factors (stiffnesses) of the coil springs 19, 20 can be selected in such a way that they oppose angular movements of the members 3, 4 relative to each other with a force in the range of between about 3 and 15 Nm/° (preferably between about 4 and 10 Nm/°). Moreover, the parameters of the coil springs 19, 20 are or can be selected in such a way than these springs can oppose rotation of the members 3, 4 relative to each other through angles of at least 30° (in the direction of pull or while the vehicle is coasting).

The element 36 preferably forms part of the hub 6; however, it is also possible to employ separately produced parts which are thereupon welded, riveted and/or otherwise rigidly and form-lockingly secured to each other.

In addition to or in lieu of the ring gear 56, the input member 3 can carry an annular pulse generating device IR (shown in FIGS. 2 and 3) of any known design which generates and transmits signals, e.g., at least for the management of the engine in a motor vehicle. Such pulse generating devices are described and shown in numerous U.S. and foreign patents and patent applications owned by the assignee of the present application. The illustrated pulse generating device IR is welded and/or otherwise affixed to the radially outermost portion of the component 14 at that side of the input member 3 which confronts the engine when the bolts 5 secure the portion 14a of the component 14 to the output part of the engine.

The ring gear 56 can be located at or close to the same distance from the axis X as the energy storing elements 13. The feature that the teeth 62 of the gear 56 are located at or radially inwardly of the peripheral surface 63 of the housing 11 contributes to compactness of the vibration damping apparatus 2.

The internal surface of the wear-resistant insert 30 can be in full or partial contact with the radially outermost portion of each convolution of each coil spring 19, at least while the springs 19 are being acted upon by centrifugal force. The utilization of an insert 30 having a concave (arcuate) cross-sectional outline in a plane including the axis X exhibits the advantage that the radially outer portions of convolutions of the coil springs 19 can be maintained in long linear contact with the internal surface of the insert.

It is often advisable to select the parameters of the coil springs 19, 20 of the energy storing element 13 in such a way that the resistance of such springs to rotation of the members 3, 4 relative to each other is less than 3 Nm per degree or exceeds 15 Nm/°. On the other hand, the parameters of the coil springs 46 can be selected with a view to ensure that they oppose rotation of the members 3, 4 relative to each other with a force in the range of between about 0.5 and 6

Nm/°, preferably with a force within the range of between about 0.8 and 3 Nm/°. The utilization of an inner damper 10 having a relatively small diameter exhibits the advantage that this damper can offer relatively low resistance to rotation of the members 3, 4 relative to each other. In addition, such dimensioning of the damper 10 renders it possible to employ coil springs 46 having relatively large diameters which enables such coil springs to offer a required,(and, if necessary, large) resistance to compression. The profiled portions 34, 35 limit the range of the inner damper 10.

Figure 5:
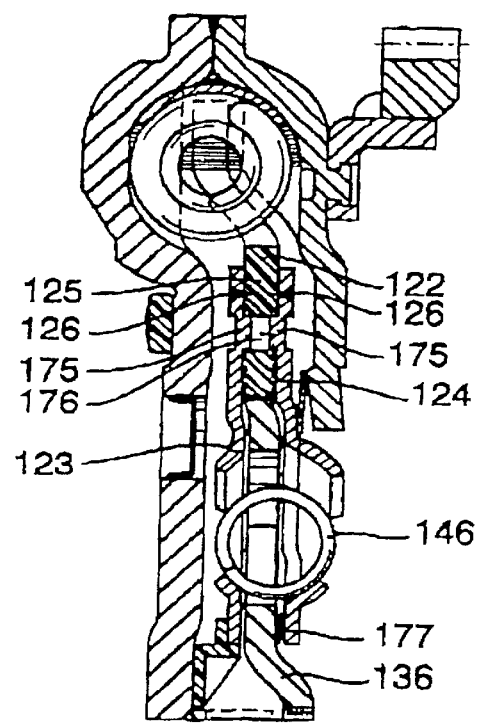
FIG. 5 is a fragmentary axial sectional view of a modified vibration damping apparatus.

FIG. 5 shows a portion of a modified vibration damping apparatus wherein the walls 123, 124 are welded (at 126) to the main portion 125 of the annular section 122. The welded seams 126 are or can be formed by resorting to a laser beam welding technique. The walls 123, 124 are preferably made of a suitable metallic sheet material, and each of the two seams 126 is preferably a circumferentially complete circular seam which is established through the respective wall; this ensures that the seams 126 act as seals which prevent communication between the space being flanked by the walls 123, 124 and the space surrounding the radially outermost portions of such walls.

In order to properly position (center) the walls 123, 124 relative to each other prior to making of the welded seams 126, these walls are provided with axially extending protuberances 175 projecting into a recess (hole) 176 of the annular section 122. The latter can be provided with two or more recesses 176 each of which receives a protuberance 175 of the wall 123 and a protuberance 175 of the wall 124.

The compartment which is defined by the walls 123, 124 with the annular section 122 can receive a supply of viscous fluid which produces a hydraulic damping action during flow into and from the compartments between the cooperating profiled portions (not shown) of the annular section 122 and the annular element 136.

FIG. 5 further shows a resilient element 177 in the form of a diaphragm spring which reacts against the radially innermost portion of the wall 124 and bears against the annular element 136 to seal the radially inner portion of the aforementioned compartment between the walls 123, 124 and the annular section 122. The diaphragm spring 177 causes the annular element 136 to generate frictional hysteresis when it is caused to turn relative to the walls 123, 124 and/or vice versa. Such hysteresis acts in parallel with the coil springs 146 (only one shown in FIG. 5) of the radially inner damper corresponding to the damper 10 in the vibration damping apparatus 2 of FIGS. 1 to 3.

The parts 123, 124 and 136 are or can be made of steel. A friction bearing (such as one corresponding to the friction bearing 53 shown in and fully described with reference to FIG. 3) can be installed between the wall 123 of the input member and the annular element 136 of the composite damper forming part of the apparatus shown in FIG. 5.

In all other respects, the vibration damping apparatus including the structure shown in FIG. 5 is or can be identical with the apparatus 2 of FIGS. 1 to 3. A difference between the two apparatus is that the structure of FIG. 5 does not employ a pulse generating device corresponding to the pulse generating device IR shown in FIGS. 2 and 3. Furthermore, the starter gear shown in the upper right-hand portion of FIG. 5 is mounted on a carrier which is affixed to the housing by rivets forming integral parts of the housing.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of oscillation dampers for use in the power trains of motor vehicles and, therefore, such adaptations should and are intended to be comprehended within the meaning and range of equivalence of the appended claims.

What is claimed is:

1. A vibration damping apparatus, comprising:
   an input member rotatable about a predetermined axis and including two dished components non-rotatably connected to each other and defining an annular chamber, one of said components including a radially inner portion having openings for fasteners arranged to secure said one component to a rotary output part of a prime mover;
   an output member rotatable about said axis with and relative to said input member;
   a bearing interposed between said input and output members radially outwardly of said openings; and
   a damper assembly arranged to yieldably oppose rotation of such input and output members relative to each other and including energy storing elements at least partially confined in said chamber, said chamber having a sealed radially outer portion and said output member comprising a radially inner portion including a hub having an internal gear directly connectable with and arranged to transmit torque to and receive torque from a rotary part of a power train of the prime mover, said damper assembly further comprising a rotary annular output element arranged to transmit torque between said input member and said hub and having at least some freedom of rotation relative to said input member against the opposition of at least some of said energy storing elements.

2. The apparatus of claim 1, wherein said rotary part of the power train includes a shaft non-rotatably receivable in said internal gear of said hub.

3. The apparatus of claim 1, wherein said components have radially outer portions remote from said axis and sealingly secured to each other.

4. The apparatus of claim 1, wherein said components are ring-shaped and have neighboring radially outer portions remote from said axis, said input member further comprising a circumferentially complete welded seam sealingly connecting said radially outer portions of said components to each other to thus prevent escape of a viscous fluid from said chamber radially outwardly beyond said radially outer portions of said components.

5. The apparatus of claim 1, wherein at least a portion of at least one of said components consists of a metallic sheet material.

6. The apparatus of claim 1, further comprising a supply of a lubricant in said chamber.

7. The apparatus of claim 6, wherein said lubricant is a grease.

8. The apparatus of claim 1, wherein said annular chamber includes a plurality of arcuate sections each of which receives at least one energy storing element, said input member further having abutments alternating with said arcuate sections, as seen circumferentially of said chamber, and contacting the energy storing elements in the neighboring sections of said chamber.

9. The apparatus of claim 8, wherein said chamber has at least two arcuate sections having radii of curvature at least approximating each other.

10. The apparatus of claim 8, wherein the energy storing elements in said sections of said chamber include at least two arcuate energy storing elements having radii of curvature which at least approximate each other.

11. The apparatus of claim 8, wherein the number of energy storing elements in said arcuate sections of said chamber is less than five and each of said arcuate sections extends along an arc of between 60% and 96% of 360°/n wherein n is the number of said sections.

12. The apparatus of claim 8, wherein the number of energy storing elements in said sections of said chamber is less than five and the energy storing elements in said sections are arcuate energy storing elements having centers of curvature at least close to said axis, the energy storing elements in said sections of said chamber extending along arcs of between 60% and 96% of 360°/n wherein n is the number of said arcuate energy storing elements.

13. The apparatus of claim 1, wherein said chamber is a circumferentially complete chamber and said energy storing elements occupy between about 60% and 95% of said chamber, as seen in a circumferential direction of said input member.

14. The apparatus of claim 1, wherein each of said energy storing elements comprises at least one coil spring.

15. The apparatus of claim 1, wherein at least one of said energy storing elements comprises a plurality of coil springs which operate in series.

16. The apparatus of claim 15, wherein the coil springs of said plurality of coil springs include at least two coil springs having different stiffnesses.

17. The apparatus of claim 1, wherein at least one of said energy storing elements includes a plurality of interfitted coil springs.

18. The apparatus of claim 17, wherein said interfitted coil springs have different lengths.

19. The apparatus of claim 1, wherein said annular chamber has a first radius of curvature and at least one of said energy storing elements has a second radius of curvature at least approximating said first radius of curvature.

20. The apparatus of claim 1, wherein said one component further comprises a radially outer portion remote from said axis, said rotary annular output element having windows affording access to a tool for manipulation of said fasteners.

21. The apparatus of claim 20, wherein said fasteners are threaded fasteners having (a) shanks extending through the respective openings when said one component is connected to the output part of the prime mover and (b) heads accessible to the tool when said one component is connected to the output part of the prime mover.

22. The apparatus of claim 1, further comprising a second gear affixed to said input member.

23. The apparatus of claim 1, further comprising a pulse generating device provided on said input member.

24. The apparatus of claim 23, wherein said prime mover is a combustion engine and said pulse generating device is arranged to transmit impulses for management of the engine.

25. The apparatus of claim 1, wherein said one component further comprises a radially outer portion remote from said axis and the other of said components is connected to said radially outer portion of said one component, said chamber being flanked by said components and further comprising a ring-shaped second gear carried by said other component.

26. The apparatus of claim 25, further comprising a ring-shaped carrier affixed to said other component and supporting said second gear.

27. The apparatus of claim 26, wherein said carrier comprises a tubular portion at least substantially coaxial with said input member and supporting said second gear.

28. The apparatus of claim 26, wherein at least some of said energy storing elements are disposed at a first radial distance from said axis and said carrier is a ring located at a second radial distance from said axis at least approximating said first distance.

29. The apparatus of claim 1, wherein said input member has an internal surface bounding said radially outer portion of said chamber, said energy storing elements including arcuate springs bearing against said internal surface at least under the action of centrifugal force while said input member rotates about said axis.

30. The apparatus of claim 29, wherein said arcuate springs have radially outermost portions and said internal surface of said input member has an outline at least partially conforming to the outlines of said radially outermost portions of said arcuate springs.

31. The apparatus of claim 29, wherein said input member further comprises a wear-resistant portion defining said internal surface.

32. The apparatus of claim 31, wherein said wear-resistant portion includes at least one insert carried by at least one of said components.

33. The apparatus of claim 31, wherein said wear-resistant portion of said input member comprises at least one insert containing sheet steel.

34. The apparatus of claim 33, wherein said components of said input member have a first hardness and said at least one insert has a second hardness exceeding said first hardness.

35. The apparatus of claim 31, wherein said wear-resistant portion has an arcuate cross-sectional outline in a plane including said axis.

36. The apparatus of claim 35, wherein said cross-sectional outline has an at least substantially constant radius of curvature.

37. The apparatus of claim 36, wherein said cross-sectional outline extends along an arc of between about 45° and 120°.

38. The apparatus of claim 36, wherein said cross-sectional outline extends along an arc of between about 60° and 90°.

39. The apparatus of claim 31, wherein said wear-resistant portion includes at least one substantially trough-shaped arcuate insert.

40. The apparatus of claim 1, wherein said damper assembly includes a first damper having a first set of said energy storing elements and located in said radially outer portion of said chamber, and a second damper located radially inwardly of said first damper.

41. The apparatus of claim 40, wherein said first damper is connected in series with said second damper.

42. The apparatus of claim 40, wherein said second damper is disposed radially inwardly of one component of said input member.

43. The apparatus of claim 40, wherein said second damper includes a second set of said energy storing elements, said rotary annular output element being non-rotatably connected with said hub and having windows for the energy storing elements of said second set, and further comprising an annular section extending radially outwardly beyond said second damper and engaging the energy storing elements of said first set.

44. The apparatus of claim 43, wherein said annular section comprises arms alternating with the energy storing elements of said first set as seen in a circumferential direction of said annular chamber.

45. The apparatus of claim 43, further comprising two substantially disc-shaped walls non-rotatably connected with and flanking said annular section as seen in the direction of said axis.

46. The apparatus of claim 45, wherein said walls are located radially inwardly of said first damper.

47. The apparatus of claim 45, wherein said walls have windows for the energy storing elements of said second set.

48. The apparatus of claim 43, wherein said annular output element includes a radially outer portion having first profiled sections and said annular section has a radially inner portion having second profiled sections mating with said first profiled sections with a play as seen in a circumferential direction of said annular output element.

49. The apparatus of claim 48, wherein said first and second profiled sections define variable-capacity compartments for said viscous fluid.

50. The apparatus of claim 49, further comprising sealing means flanking said compartments as seen in the direction of said axis.

51. The apparatus of claim 50, wherein said sealing means comprises at least one ring-shaped washer.

52. The apparatus of claim 48, wherein said play determines the extent of angular movability of constituents of said second damper relative to each other.

53. A vibration damping apparatus, comprising: an input member rotatable about a predetermined axis and including two components non-rotatably connected to each other and defining an annular chamber, one of said components including a radially inner portion having openings for fasteners arranged to secure said one component to a other part;
an output member rotatable about said axis with and relative to said input member;
a damper assembly arranged to yieldably oppose rotation of said input and output members relative to each other and including energy storing elements at least partially confined in said chamber, said chamber having a sealed radially outer portion and said output member comprising a radially inner portion including a hub having an internal gear directly connectable with and arranged to transmit torque to and receive torque from a rotary part of a power train, said damper assembly further comprising an annular output element arranged to transmit torque between said input member and said hub, said output element being non-rotatably connected with said hub and having at least some freedom of rotation relative to said input member against the opposition of at least some of said energy storing elements, said damper assembly further including a first damper having a first set of said energy storing elements and being located in said radially outer portion of said chamber and a second damper located radially inwardly of said first damper, said second damper including a second set of said energy storing elements and said output element having windows for the energy storing elements of said second set; and
an annular intermediate section disposed between said components, extending radially outwardly beyond said second damper and engaging the energy storing elements of said first and second sets.

54. The apparatus of claim 53, wherein said first damper is connected in series with said second damper.

55. The apparatus of claim 53, wherein said second damper is disposed radially inwardly of one component of said input member.

56. The apparatus of claim 53, wherein said annular intermediate section comprises arms alternating with the energy storing elements of said first set as seen in a circumferential direction of said annular chamber.

57. The apparatus of claim 53, wherein said intermediate section comprises two substantially disc-shaped walls non-rotatably connected with and flanking said annular output element as seen in the direction of said axis.

58. The apparatus of claim 57, wherein said walls are located radially inwardly of said first damper.

59. The apparatus of claim 57, wherein said walls have windows for the energy storing elements of said second set.

60. The apparatus of claim 53, wherein said annular output element includes a radially outer portion having first profiled sections and said annular intermediate section has a radially inner portion having second profiled sections mating with said first profiled sections with a play as seen in a circumferential direction of said annular output element.

61. The apparatus of claim 60, wherein said first and second profiled sections define variable-capacity compartments for a supply of viscous fluid in said chamber.

62. The apparatus of claim 61, further comprising sealing means flanking said compartments as seen in the direction of said axis.

63. The apparatus of claim 62, wherein said sealing means comprises at least one ring-shaped washer.

64. The apparatus of claim 60, wherein said play determines the extent of angular movability of constituents of said second damper relative to each other.

65. A vibration damping apparatus, comprising:
an input member rotatable about a predetermined axis and including components defining an annular chamber;
an output member rotatable about said axis with and relative to said input member; and
a damper assembly arranged to yieldably oppose rotation of said input and output members relative to each other and including energy storing elements at least partially confined in said chamber, said chamber having a sealed radially outer portion and being at least partially filled with a supply of a viscous fluid, said output member comprising a radially inner portion including a hub connectable with and arranged to transmit torque to and receive torque from a rotary part of a power train, said damper assembly further comprising a rotary annular output element arranged to transmit torque between said input member and said hub and having at least some freedom of rotation relative to said input member against the opposition of at least some of said energy storing elements, said damper assembly further including a first damper having a first set of said energy storing elements and located in said radially outer portion of said chamber and a second damper located radially inwardly of said first damper and including a second set of said energy storing elements, said rotary annular output element being non-rotatably connected with said hub and having windows for the energy storing elements of said second set, said damper assembly further comprising an annular section extending radially outwardly beyond said second damper and engaging the energy storing elements of said first set, said annular output element further having a radially outer portion including first profiled sections and said annular section having a radially inner portion including second profiled sections mating with said first profiled sections with a play as seen in a circumferential direction of said annular output element.

66. The apparatus of claim 65, wherein said first and second profiled sections define variable-capacity compartments for said viscous fluid.

67. The apparatus of claim 66, further comprising sealing means flanking said compartments as seen in the direction of said axis.

68. The apparatus of claim 67, wherein said sealing means comprises at least one ring-shaped washer.

69. The apparatus of claim 65, wherein said play determines the extent of angular movability of constituents of said second damper relative to each other.

* * * * *